(12) United States Patent
Lim

(10) Patent No.: US 7,572,059 B2
(45) Date of Patent: Aug. 11, 2009

(54) FLUID CIRCULATING HYDRODYNAMIC PRESSURE BEARINGS

(75) Inventor: Tae Hyeong Lim, Gyeonggi-do (KR)

(73) Assignee: Samsung Electro-Mechanics Co., Ltd., Tokyo (JP)

( * ) Notice: Subject to any disclaimer, the term of this patent is extended or adjusted under 35 U.S.C. 154(b) by 390 days.

(21) Appl. No.: 11/518,410

(22) Filed: Sep. 11, 2006

(65) Prior Publication Data

US 2007/0071376 A1    Mar. 29, 2007

(30) Foreign Application Priority Data

Sep. 28, 2005    (KR) ...................... 10-2005-0090523

(51) Int. Cl.
*F16C 32/06* (2006.01)
(52) U.S. Cl. ...................... 384/100; 384/107
(58) Field of Classification Search ................ 384/100, 384/107, 112–115, 119, 121, 123; 310/90; 360/99.08, 98.07
See application file for complete search history.

(56) References Cited

U.S. PATENT DOCUMENTS

| | | | |
|---|---|---|---|
| 5,988,886 A * | 11/1999 | Takahashi | 384/107 |
| 6,034,454 A * | 3/2000 | Ichiyama | 310/90 |
| 6,181,039 B1 | 1/2001 | Kennedy et al. | |
| 6,246,136 B1 * | 6/2001 | Ichiyama | 310/90 |
| 7,008,109 B2 * | 3/2006 | Gomyo et al. | 384/100 |
| 7,059,771 B2 * | 6/2006 | Gomyo et al. | 384/100 |
| 7,201,517 B2 * | 4/2007 | Gomyo et al. | 384/107 |
| 7,293,917 B2 * | 11/2007 | Jang et al. | 384/123 |
| 7,365,940 B2 * | 4/2008 | Yamamoto et al. | 360/99.08 |
| 2004/0070298 A1 * | 4/2004 | Aiello et al. | 310/90 |
| 2004/0091187 A1 * | 5/2004 | Aiello et al. | 384/112 |
| 2004/0161182 A1 * | 8/2004 | Kusaka et al. | 384/107 |
| 2004/0179294 A1 * | 9/2004 | Asada et al. | 360/99.08 |
| 2005/0069232 A1 * | 3/2005 | Aiello et al. | 384/100 |
| 2006/0274448 A1 * | 12/2006 | Asada et al. | 360/99.08 |

FOREIGN PATENT DOCUMENTS

| | | |
|---|---|---|
| JP | 8-210364 | 8/1996 |
| JP | 2937833 | 6/1999 |
| JP | 2005-16556 | 1/2005 |

* cited by examiner

*Primary Examiner*—Richard W L Ridley
*Assistant Examiner*—Phillip Johnson

(57) ABSTRACT

A bearing includes a hub to drive recording media; a sleeve to rotatably support the hub to define a hydrodynamic pressure generating space between the hub and the sleeve, the sleeve being formed with a fluid outlet through which the fluid passes at the predetermined position; a plurality of recesses to generate hydrodynamic pressure, the recesses being formed on at least one of the hub and the sleeve to be opened toward the hydrodynamic pressure generating space; and a fluid circulating member to circulate the fluid out-flowing from the fluid outlet to the hydrodynamic pressure generating space, the member being fixedly combined with the hub to slidably support the sleeve.

10 Claims, 3 Drawing Sheets

FLUID CIRCULATING HYDRODYNAMIC PRESSURE BEARINGS

BACKGROUND OF THE INVENTION

1. Field of the Invention

The present invention relates to a hydrodynamic pressure bearing, and more particularly, to a hydrodynamic pressure bearing enabling to repeatedly circulate fluid for generating hydrodynamic pressure therein.

2. Description of the Related Art

A hydrodynamic pressure bearing serves to generate the driving force of a spindle motor being installed in a hard disk driver and the like. One of examples, Japanese Patent Registration No. 2,937,833 discloses ⌈Bearing seal system⌋, which is illustrated with reference to FIGS. 3 and 4.

As shown, the bearing seal system is composed of a shaft 31 and a radial bearing section 24.

The radial bearing section 24 is arranged on the shaft-orientations outside, and provided with a clearance change section 50 for preventing leakage of the oil 15 present between the bearing section 24 and the shaft 21. Also, an oil surface section 15a of the oil 15 filled up the cylinder-like bag part 40 is set up to be located in the clearance change section 50.

The clearance change section 50 has a clearance change circles edge 50a set as the shaft-orientations most inner edge by the side of the radial bearing 24 and a clearance change section outer edge 50b set as the outermost edge of the clearance change section 50. The clearance change circles edge 50a is smallest and the clearance change section outer edge 50b is largest, and also a clearance tilt angle α is made therebetween.

Although the inner capacity of the bag part 40 is not constant during manufacturing or injection of the oil 15, the inner capacity of the bag part 40 is changed by the rise of the shaft 31 or heat due to the rotation of the shaft 31, or the change of the amount of the oil 15 due to the inner mixed air is raised, the constant amount of oil 15 will always be kept in the bearing section 24 without leakage since the inner capacity of the clearance change section 50 is relatively greater than the inner capacity of the bag part 40 or radial bearing section 24.

However, the sealing system described above has a drawback that may not keep the oil in the bag part 40 and then raise oil leakage if variation of conditions such as viscosity of oil or heat generated by the rotation of the shaft and the like exceeds the design criteria thereof.

SUMMARY OF THE INVENTION

Accordingly, the present invention is directed to a Fluid circulation type hydrodynamic pressure bearing that substantially obviates one or more problems due to limitations and disadvantages of the related art.

One object of the present invention is to provide a hydrodynamic pressure bearing enabling to prevent an outward leakage of the fluid regardless of the change of the surrounding condition by repeatedly circulating the fluid in the bearing through a fluid circulating member.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings. To achieve these objects and other advantages and in accordance with the purpose of the invention, as embodied and broadly described herein, a vibration motor comprises: a driving member for driving writing medium; a supporting member for rotatably supporting the driving member to have a hydrodynamic pressure generating space formed between the supporting member and the driving member, the supporting member being formed with a fluid outlet through which the fluid passes; a plurality of recesses for generating hydrodynamic pressure, the recesses being formed on at least one of the driving member and the supporting member to be open toward the hydrodynamic pressure generating space; a fluid circulating member for circulating the fluid passed through the fluid outlet, the fluid circulating member being fixedly combined with the driving member to slidably support the supporting member.

The supporting member may have a shaft combining portion with which the driving member is axially combined and a hydrodynamic pressure generating portion for generating hydrodynamic pressure, also the fluid outlet may be formed to be open from the hydrodynamic pressure generating portion toward the fluid circulating member. Further, the fluid circulating member may have a fluid keeping space for keeping the fluid passed through the fluid outlet during a predetermined time and a fluid sending hole for sending the fluid kept in the fluid keeping space to the hydrodynamic pressure generating space. Wherein, the fluid keeping space may be formed to have a wedge shape section in which a portion open toward the fluid outlet is smaller than a portion open toward the fluid sending hole. At this time, the fluid kept in the fluid keeping space is sent to the fluid sending hole by the capillary action, and the fluid keeping space may be formed to have 0°~90° of upper surface thereof.

Further, the fluid sending hole may be formed to pass through the upper and lower surfaces of the fluid circulating member.

In the present invention, when the driving member is driven, the fluid kept in the fluid keeping space is applied with centrifugal force and it is sent to the fluid sending hole by centrifugal force.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention are incorporated and constitute as a part of this application, illustrate embodiment(s) of the invention and together with the descriptions serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
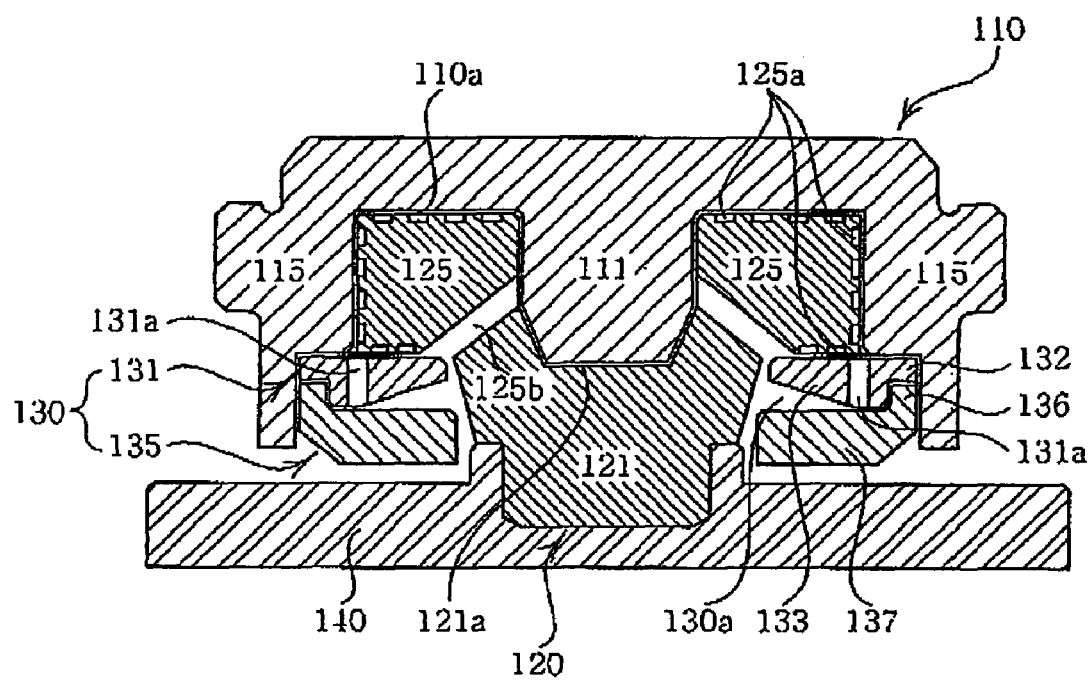
FIG. 1 is a cross sectional view schematically illustrating a hydrodynamic pressure bearing according to the preferred embodiment of the present invention.

As shown in FIG. 1, a hydrodynamic pressure bearing 100 according to a preferred embodiment of the present invention comprises a hub 110, a sleeve 120 and a fluid circulating member 130.

The hub 110 serves to mount recording media (not shown) such as a hard-disk thereon and rotate it, and it has an annular hydrodynamic pressure generating space 110a being formed in central portion thereof. Also, the hub 110 has an shaft portion 111 and a rim portion 115 formed on the inside and outside respectively with respect to the hydrodynamic pressure generating space 110a.

The shaft portion 111 is integrally extended from an inner central portion of the hub 110, and an end portion thereof is tapered to be easily rotated.

The rim portion 115 is integrally extended from a shaft portion 111 of the hub 110, and an end portion thereof is extended to be longer than the end portion of the shaft portion 111.

The sleeve 120 serves to rotatably support the hub 110, and it has a shaft combining portion 121 and a hydrodynamic pressure generating portion 125 formed on the central portion and both rim thereof, respectively.

The shaft combining portion 121 has an upper portion formed with a shaft combining recess 121a thereon, into which the shaft portion 111 is inserted, and a lower portion being downwardly extended and fixedly combined with the base 140 of the spindle motor (not shown).

The hydrodynamic pressure generating portion 125 is integrally formed with the shaft combining portion 121, and it is inserted into the hydrodynamic pressure generating space 110a formed in the hub 110. Wherein, the hydrodynamic pressure generating portion 125 has an annular shape corresponding to the space 110a so as to be inserted into the space 110a in closely contact.

Also, the hydrodynamic pressure generating portion 125 has a plurality of hydrodynamic pressure generating recesses 125a with a predetermined shape formed on an upper surface, an outer periphery surface and a lower surface, respectively, and the fluid outlet 125b slantingly formed on a portion connected with the shaft combining portion 121.

In this embodiment, the fluid outlet 125b is formed slantingly, but alternately, it may be formed in certain structures, which the fluid well flows out, and the fluid outlet 125b may be disposed not in the fluid circulating member 130 but on the lower hydrodynamic pressure surface of the sleeve 120, between the lower hydrodynamic pressure surface and the side surface of the sleeve 120, or to connect with the side surface of the sleeve 120.

Also, in this embodiment, the hydrodynamic pressure generating recesses 125a is formed in the sleeve 120, alternately, the recesses 125a may be formed on an inner periphery surface of the hub 110 face to the corresponding portion of the sleeve 120 or, alternately they may be formed on both the sleeve 120 and the inner periphery surface of the hub 110 in turn.

The fluid circulating member 130 serves to repeatedly re-circulate the fluid flowing out through the fluid outlet 125b formed in the sleeve 120 toward the hydrodynamic pressure generating space 110a. Also, the member 130 has a stopper 131 not only supporting the sleeve 120, particularly the hydrodynamic pressure generating portion 125 but also providing the hydrodynamic pressure generating space 110a, and a sealing cap 135 sealing a lower surface of the stopper 131 so as to prevent outward leakage of the fluid.

The stopper 131 has an annular shape, and a first hub combining portion 132 and a sleeve supporting portion 133 integrally formed with each other.

The first hub combining portion 132 is fixedly combined with an inner periphery surface of the rim portion 115 of the hub 110, thereby the stopper 131 being rotated together with the hub 110.

The sleeve supporting portion 133 is extended from the first hub combining portion 132 and has a portion of the lower surface slantingly formed from a free end thereof. The slope formed on the sleeve supporting portion 133 may range from 0° to 90°.

Also, the sleeve supporting portion 133 has the free end disposed adjacent to a slant portion of the shaft combining portion 121 of the sleeve 120, and a fluid sending hole 131a formed on a portion adjacent to the first hub combining part 132 to pass through the stopper 131 up and down.

The sealing cap 135 has an annular shape, and a second hub combining portion 136 and a fluid keeping portion 137.

The second hub combining portion 136 is fixedly combined with an inner periphery surface of the rim portion 115 of the hub 110, thereby the sealing cap 135 being rotated together with the hub 110. Wherein, the second hub combining portion 136 is also fixedly combined with a lower surface of the first hub combing portion 132 of the stopper 131.

The fluid keeping portion 137 is located below the sleeve supporting portion 133 of the stopper 131, and it has a free end disposed adjacent to the slanting portion of the shaft combining part 121 of the sleeve 120. Wherein, between the supporting portion 133 and the keeping portion 137, is made with a fluid keeping space 130a illustrated in wedge shape in the drawings. Further, wherein, the fluid keeping space 130a has an angle of the upper surface thereof ranging from 0° to 90° since the sleeve supporting portion 133 of the stopper 131 has the slanting surface ranging from 0° to 90°.

Figure 2:
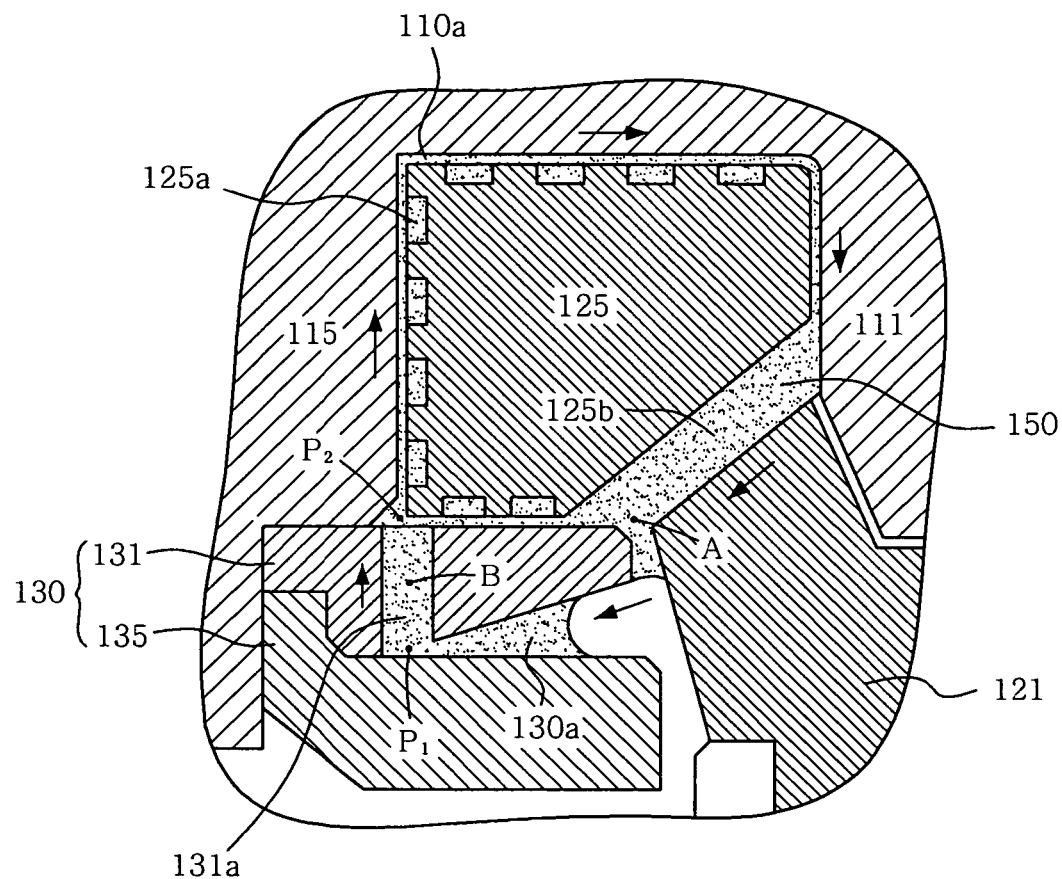
FIG. 2 is a partial enlarged view illustrating a stopper and sealing cap of FIG. 1.
Figure 3:
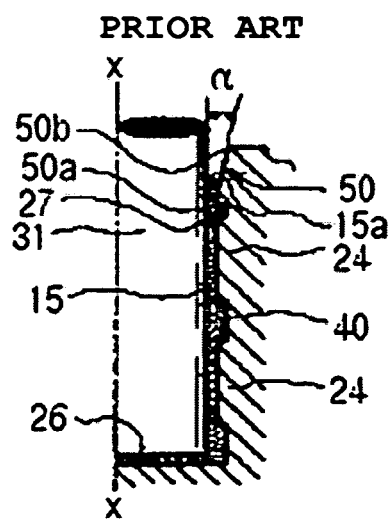
FIG. 3 is a cross sectional view schematically illustrating a conventional bearing seal system.
Figure 4:
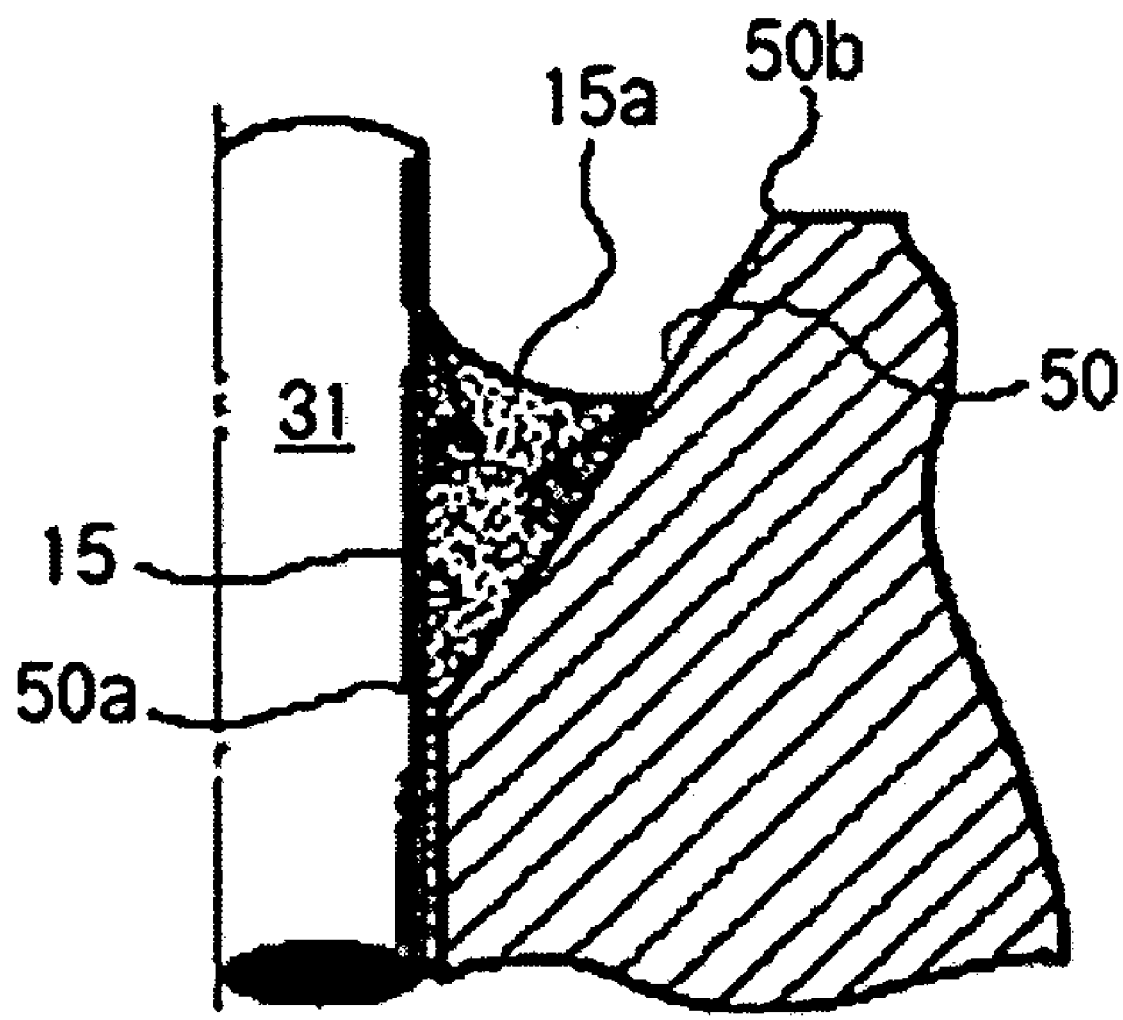
FIG. 4 is a partial enlarged view of FIG. 3.

Next, with reference to FIG. 2, the process of circulating the fluid in the hydrodynamic pressure bearing 100 of FIG. 1 will be explained in detail.

The fluid 150 is injected into the hydrodynamic pressure generating space 110a provided between the hub 110 and the sleeve 120 at the time of manufacturing of the hydrodynamic pressure bearing 100 or of injecting of additional fluid. At this time, the fluid 150 is injected through a portion indicated by "A" or "B" portion, and air or bubble in the space 110a flows out through the "B" or "A" portion during the injection of the fluid 150.

First, once the hub 110 begins to rotate under a condition of the hydrodynamic pressure generating space 110a filled with the fluid 150, the fluid 150 flows into the sleeve 120, particularly the central portion (changeable depending on the design criteria) of the hydrodynamic pressure generating portion 125 along the hydrodynamic pressure generating recess 125a.

Thereafter, while the flow of the fluid is accelerated, the hydrodynamic pressure is generated between the hub 110 and the sleeve 120, that is, in the hydrodynamic pressure generating space 110a where the hub 110 and the sleeve 120 set opposite each other, and thereby the hub 110 being raised from the sleeve 120 and rotated under that state.

Next, while the certain time lapses away, the fluid 150 is gradually heated by the frictional heat caused by the rotation of the hub 110 and then expanded, a portion of the expanded fluid 150 flows out through the fluid outlet 125b formed in the sleeve 120.

The out fluid 150 on this wise is kept by the fluid circulating member 130, particularly the stopper 131 until it reaches a designed amount, and if it exceeds the designed amount, it flows to the fluid keeping space 130a provided between the stopper 131 and the sealing cap 135.

Next, when centrifugal force is generated in the stopper 131 and sealing cap 135 rotating together with the hub 110 by the rotating force of the hub 110, it is applied to the fluid 150 kept in the fluid keeping space 130a having wedge shape.

At this time, the fluid applied with centrifugal force gradually flows into the fluid keeping space 130a, that is into a portion where an area becomes narrower in wedge shape, and the pressure P1 at that portion becomes greater than the pressure P2 between the hydrodynamic pressure generating space 110a and the stopper 131, and thereby the fluid 150 flowing from down to up along the fluid sending hole 131a and finally flowing into the hydrodynamic pressure generating space 110a. At this time, the fluid 150 is also applied with capillary force due to the wedge shape of the fluid keeping space 130a, and this force helps the fluid 150 to flow into the hydrodynamic pressure generating space 110a. Like this way, the fluid 150 can be circulated in arrow direction by centrifugal force and capillary force.

According to the hydrodynamic pressure bearing of the present invention, even though exterior conditions such as viscosity of fluid or heat caused by the rotation of the shaft etc. exceed the design range thereof, fluid may be kept in the bearing without outflow since the fluid present in the hydrodynamic pressure generating space provided in the bearing is repeatedly circulated.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A fluid circulating hydrodynamic pressure bearing, the bearing comprising:
   a driving member to drive recording media;
   a supporting member to rotatably support the driving member to define a hydrodynamic pressure generating space between the driving member and the supporting member, the supporting member being formed with a fluid outlet through which the fluid passes at a predetermined position;
   a plurality of recesses to generate hydrodynamic pressure, the recesses being formed on at least one of the driving member and the supporting member to be opened toward the hydrodynamic pressure generating space; and
   a fluid circulating member to circulate the fluid out-flowing from the fluid outlet to the hydrodynamic pressure generating space, the fluid circulating member being fixedly combined with the driving member to slidably support the supporting member,
   wherein the fluid circulating member has a fluid keeping space to keep the fluid out-flowing from the fluid outlet for a predetermined time, and a fluid sending hole to send the fluid kept in the fluid keeping space to the hydrodynamic pressure generating space.

2. The bearing according to claim 1, wherein the supporting member has a shaft combining portion axially combined with the driving member and a hydrodynamic pressure generating portion for generating hydrodynamic pressure, and the fluid outlet is slantingly formed and open from the hydrodynamic pressure generating portion to the fluid circulating member.

3. The bearing according to claim 1, wherein the fluid circulating member has a stopper to support the supporting member and a sealing cap to seal a lower surface of the stopper to prevent outward leakage of the fluid, and
   the fluid keeping space in between a lower surface of the stopper and an upper surface of the sealing cap has a wedge shape in section in which a portion open toward the fluid outlet is larger than a portion open toward the fluid sending hole.

4. The bearing according to claim 3, wherein the fluid kept in the fluid keeping space is applied with centrifugal force while the driving member is driven, and then the fluid is sent to the fluid sending hole by centrifugal force.

5. The bearing according to claim 3, wherein the fluid kept in the fluid keeping space is sent to the fluid sending hole by capillary force.

6. The bearing according to claim 5, wherein the fluid kept in the fluid keeping space is applied with centrifugal force while the driving member is driven, and then the fluid is sent to the fluid sending hole by centrifugal force.

7. The bearing according to claim 3, wherein an angle of the fluid keeping space between the lower surface of the stopper and the upper surface of the sealing cap ranges from 0° to 90°.

8. The bearing according to claim 7, wherein the fluid kept in the fluid keeping space is applied with centrifugal force while the driving member is driven, and then the fluid is sent to the fluid sending hole by centrifugal force.

9. The bearing according to claim 3, wherein the fluid sending hole is formed to pass through an upper surface of the stopper and the lower surface of the stopper.

10. The bearing according to claim 9, wherein the fluid kept in the fluid keeping space is applied with centrifugal force while the driving member is driven, and then the fluid is sent to the fluid sending hole by centrifugal force.

* * * * *